(12) United States Patent
Hashiba et al.

(10) Patent No.: US 7,368,844 B2
(45) Date of Patent: May 6, 2008

(54) MAGNETOELECTRIC GENERATOR

(75) Inventors: Mitsuharu Hashiba, Tokyo (JP); Akifumi Miyake, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 127 days.

(21) Appl. No.: 11/480,384

(22) Filed: Jul. 5, 2006

(65) Prior Publication Data
US 2007/0182268 A1 Aug. 9, 2007

(30) Foreign Application Priority Data
Feb. 8, 2006 (JP) .............................. 2006-030738

(51) Int. Cl.
*H02K 1/06* (2006.01)
(52) U.S. Cl. .................. 310/217; 310/216; 310/259
(58) Field of Classification Search ........ 310/217–218, 310/254, 259, 74, 70 A
See application file for complete search history.

(56) References Cited
U.S. PATENT DOCUMENTS

| | | | | |
|---|---|---|---|---|
| 4,912,350 A | * | 3/1990 | Parshall et al. ............. | 310/217 |
| 5,436,517 A | * | 7/1995 | Ogawa ........................ | 310/91 |
| 6,700,295 B2 | * | 3/2004 | Kanno et al. ................ | 310/261 |
| 6,727,628 B2 | * | 4/2004 | Shimada et al. ............. | 310/216 |
| 7,173,357 B2 | * | 2/2007 | Naito et al. ............. | 310/154.05 |
| 2005/0077798 A1 | * | 4/2005 | Mitsui ........................ | 310/217 |
| 2005/0285468 A1 | * | 12/2005 | Fukushima et al. ..... | 310/156.53 |
| 2007/0046125 A1 | * | 3/2007 | Torii et al. ............. | 310/156.53 |

FOREIGN PATENT DOCUMENTS

| | | |
|---|---|---|
| JP | 10-080078 A | 3/1998 |
| JP | 11-267772 A | 10/1999 |
| JP | 2001-096319 A | 4/2001 |

* cited by examiner

*Primary Examiner*—Thanh Lam
(74) *Attorney, Agent, or Firm*—Sughrue Mion, PLLC

(57) ABSTRACT

A stator core includes: a laminated body in which a plurality of intermediate plates that have dowels are laminated so as to be integrated by dowel crimping between layers; and a pair of end plates that are disposed so as to be positioned on opposite sides of two end surfaces of the laminated body, and a receiving aperture that extends parallel to an axis of rotation is formed on the laminated body, a bent portion is disposed on the end plates, and the end plates are joined to the laminated body by engaging the bent portion in the receiving aperture.

7 Claims, 6 Drawing Sheets

MAGNETOELECTRIC GENERATOR

BACKGROUND OF THE INVENTION

1. Field of the Invention

The present invention relates to a magnetoelectric generator that generates power by electromagnetic induction between a permanent magnet and a generating coil due to rotation of a flywheel.

2. Description of the Related Art

Known examples of conventional magnetoelectric generators include magnetoelectric generators that have: a bowl-shaped flywheel rotating around an axis of rotation; a plurality of permanent magnets that are fixed to an inner wall surface of the flywheel and that rotate together with the flywheel; a stator core that is disposed radially inside the permanent magnets and that has: an annulus portion; and a plurality of teeth that project radially outward from the annulus portion; an epoxy resin coating that is formed on a surface of the stator core; and a generating coil that is configured by winding conducting wire onto the teeth (see Patent Literature 1, for example).

Known examples of means of integrating a plurality of laminated plates that constitute a stator core include sequentially laminating a plurality of lamina plates that have dowels and integrating them by dowel crimping between those layers (see Patent Literature 2, for example).

[Patent Literature 1]
  Japanese Patent Laid-Open No. 2004-135382 (Gazette)

[Patent Literature 2]
  Japanese Patent Laid-Open No. 2001-96319 (Gazette)

In stator cores integrated by dowel crimping in magnetoelectric generators having the above configuration, the joining strength of two end plates onto intermediate plates between the two end plates is low because the end plates and the intermediate plates are also joined by dowel crimping, and one problem has been that gaps may arise between the end plates and the intermediate plates because of this, giving rise to pinholes in the epoxy resin coating at those gaps, for example.

SUMMARY OF THE INVENTION

The present invention aims to solve the above problems and an object of the present invention is to provide a magnetoelectric generator that enables formation of pinholes in a resin coating at gaps between end plates and intermediate plates to be reduced by increasing joining strength between the end plates and the intermediate plates, etc.

In order to achieve the above object, according to one aspect of the present invention, there is provided a magnetoelectric generator including: a bowl-shaped flywheel that rotates around an axis of rotation; a plurality of permanent magnets that are fixed to an inner wall surface of the flywheel and that rotate together with the flywheel; a stator core that is disposed radially inside the permanent magnets, that includes an annulus portion and a plurality of teeth that project radially outward from the annulus portion, and that also has an insulating film formed on a surface; and a generating coil that is configured by winding conducting wire onto the teeth, the stator core including: a laminated body in which a plurality of intermediate plates that have dowels are laminated so as to be integrated by dowel crimping between layers; and a pair of end plates that are disposed so as to be positioned on opposite sides of two end surfaces of the laminated body, the magnetoelectric generator being characterized in that a receiving aperture that extends parallel to the axis of rotation is formed on the laminated body, an engaging portion is disposed on the end plates, and the end plates are joined to the laminated body by engaging the engaging portion in the receiving aperture.

Using a magnetoelectric generator according to the present invention, formation of pinholes in a resin coating at gaps between the end plates and the intermediate plates can be reduced by increasing joining strength between the end plates and the intermediate plates.

DETAILED DESCRIPTION OF THE PREFERRED EMBODIMENTS

Figure 1:
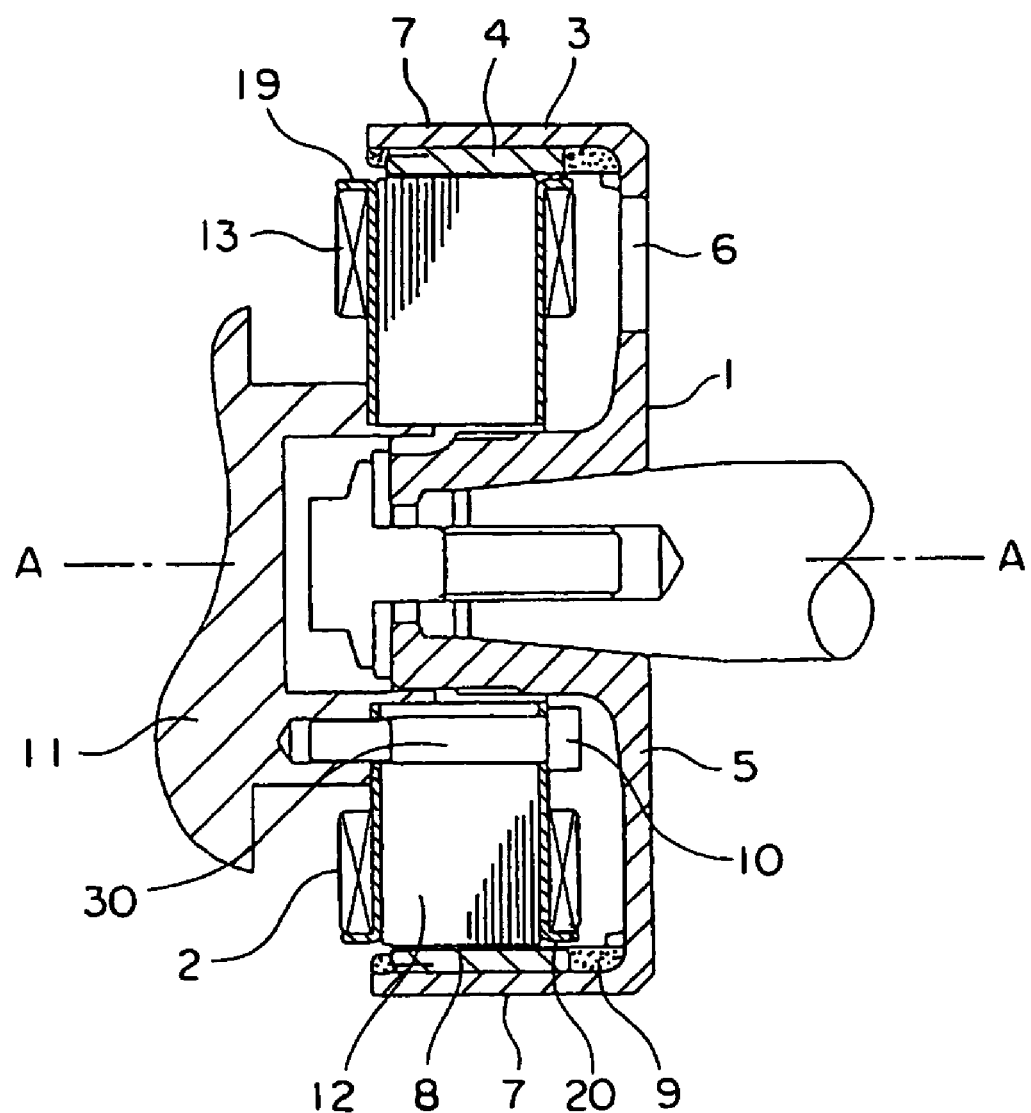
FIG. 1 is a lateral cross section of a magnetoelectric generator according to Embodiment 1 of the present invention.

Preferred embodiments of the present invention will now be explained based on the drawings, and identical or corresponding members and portions in the drawings will be given identical numbering.

Embodiment 1

Figure 2:
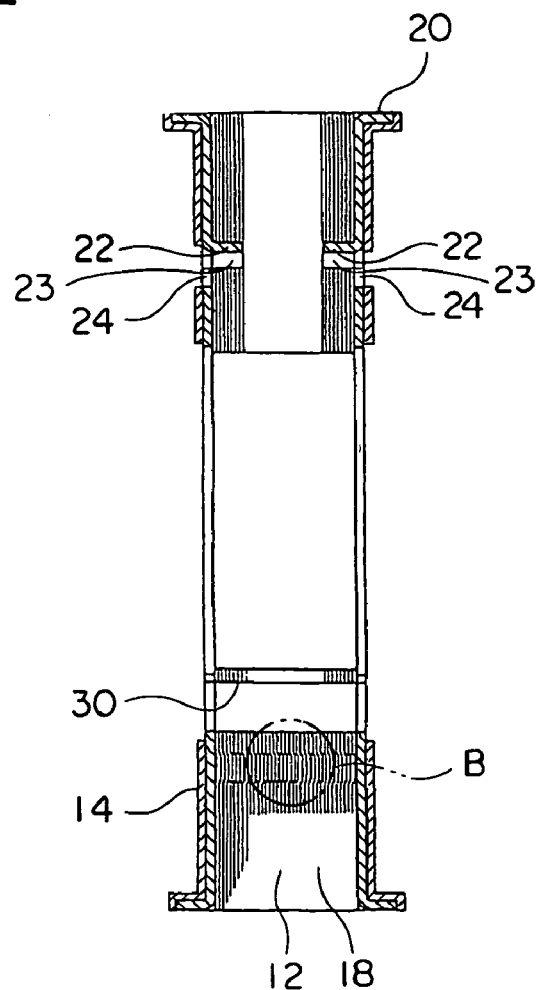
FIG. 2 is a lateral cross section of a stator from FIG. 1.
Figure 3:
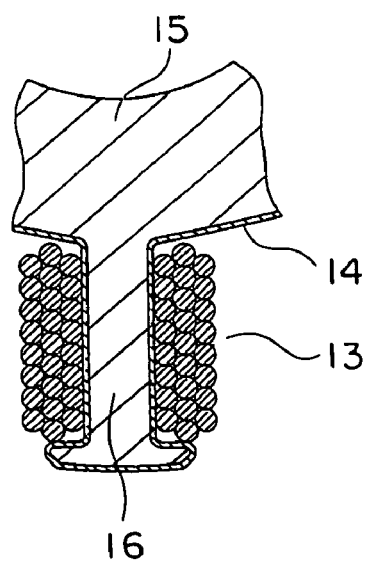
FIG. 3 is a partial frontal cross section of a generating coil from FIG. 1.

FIG. 1 is a lateral cross section of a magnetoelectric generator according to Embodiment 1 of the present invention, FIG. 2 is a lateral cross section of a stator 2 from FIG. 1, and FIG. 3 is a partial frontal cross section of a generating coil 13 from FIG. 1.

This magnetoelectric generator includes: a rotor 1 that is linked to an internal combustion engine; and a stator 2 that is disposed outside the rotor 1.

The rotor 1 has: a bowl-shaped flywheel 3; and permanent magnets 4 that are fixed to the flywheel 3. A plurality of ventilating apertures 6 are formed on a bottom portion 5 of the flywheel 3. The rotor 1 rotates around an axis of rotation A-A.

The permanent magnets 4 are fixed to an inner surface of a tubular portion 7 of the flywheel 3 at a uniform angular pitch from each other around the axis of rotation A-A. The plurality of permanent magnets 4 are magnetized such that adjacent permanent magnets 4 have reverse polarity to each other such that a magnetic field that alternately changes in direction is generated in a space inside the permanent magnets 4.

A tubular protective ring 8 is inserted so as to be placed in close contact with inner surfaces of each of the permanent magnets 4. First and second end portions of each of the permanent magnets 4 in a direction of the axis of rotation A-A and spaces between adjacent permanent magnets 4 are filled with a molded material 9. The plurality of permanent magnets 4 and the protective ring 8 are fixed to an inner surface of the tubular portion 7 of the flywheel 3 by the molded material 9.

The stator 2 includes: a hollow cylindrical stator core 12; and generating coils 13. The stator core 12 has an entire surface covered by an insulating resin film 14 that constitutes an insulating film, and includes: an annulus portion 15; and a plurality of teeth 16 that project radially outward from the annulus portion 15 at a uniform pitch circumferentially in a radial pattern.

A plurality of penetrating apertures 30 are formed on the stator core 12 so as to be spaced apart circumferentially. The stator 2 is fixed to a bracket 11 that constitutes a nonrotating body by passing mounting bolts 10 that constitute a fixing member through the penetrating apertures 30 and screwing them into the bracket 11.

The stator core 12 includes: a laminated body 18 that is configured by laminating a large number of intermediate plates 17 in a direction of the axis of rotation A-A, the intermediate plates 17 being constituted by doughnut disk-shaped thin magnetic steel plates (cold-rolled steel plates of SPCC, etc., for example) that constitute cold-rolled steel plates; and a first end plate 19 and a second end plate 20 that are respectively stacked in close contact with first and second end surfaces of the laminated body 18. Moreover, since outer surfaces of the two intermediate plates 17 that come into surface contact with the first end plate 19 and the second end plate 20, respectively, are flat surfaces, gaps will not arise between the first end plate 19 and the intermediate plates 17 or between the second end plate 20 and the intermediate plates 17.

Figure 4:
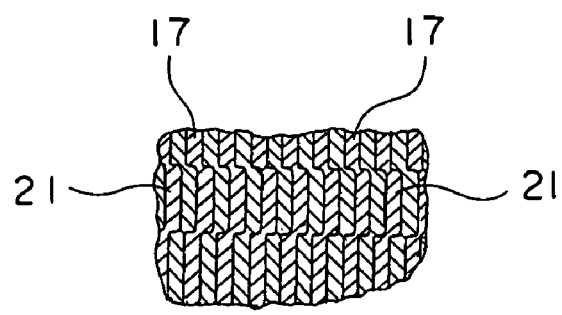
FIG. 4 is an enlargement of portion B in FIG. 2.

As shown in FIG. 4, in which portion B from FIG. 2 is enlarged, the laminated body 18 is integrated by dowel crimping the plurality of intermediate plates 17, which have dowels (creased portions), to each other.

The generating coils 13 are each configured by winding a copper wire that constitutes a conducting wire onto circumferential side surfaces of the teeth 16.

Figure 5:
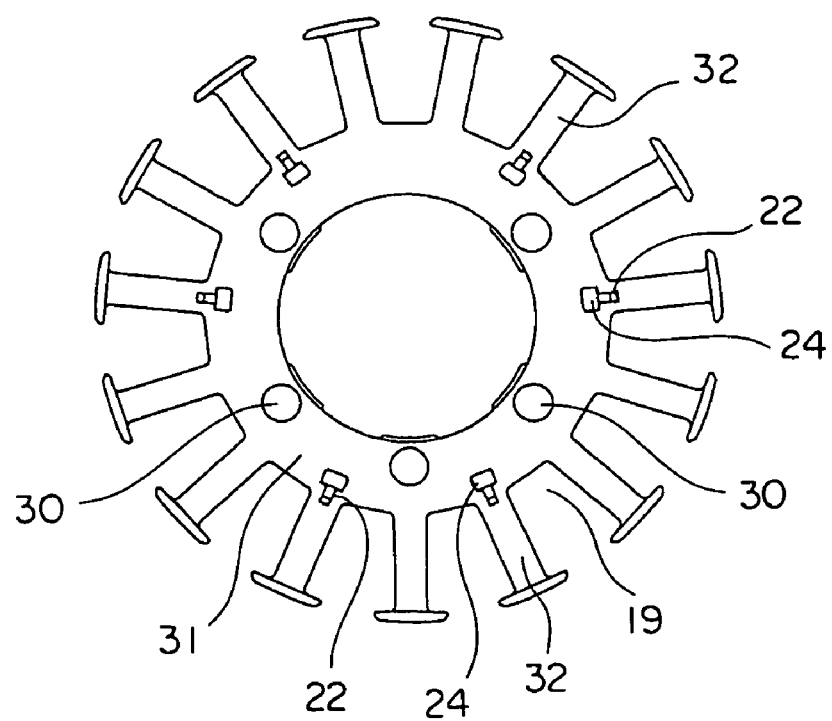
FIG. 5 is a front elevation of a first end plate from FIG. 1.

As shown in FIG. 5, the first end plate 19 and the second end plate 20 have: an end plate main body 31; and a plurality of tooth portions 32 that project radially outward from the end plate main body 31 at a uniform pitch circumferentially in a radial pattern. Outer edge portions of the first end plate 19 and the second end plate 20 are respectively bent at approximately 90 degrees toward the generating coils 13 in order to prevent the generating coils 13 from collapsing radially outward, and to induce magnetic flux in the teeth 16.

A plurality of bent portions 22 that have L-shaped cross sections that constitute an engaging portion are formed so as to be spaced apart circumferentially on root portions of the tooth portions 32 radially outside the penetrating apertures 30 on the end plate main body 31. Window portions 24 are formed radially inside the bent portions 22, which are formed by cutting and bending.

Figure 6:
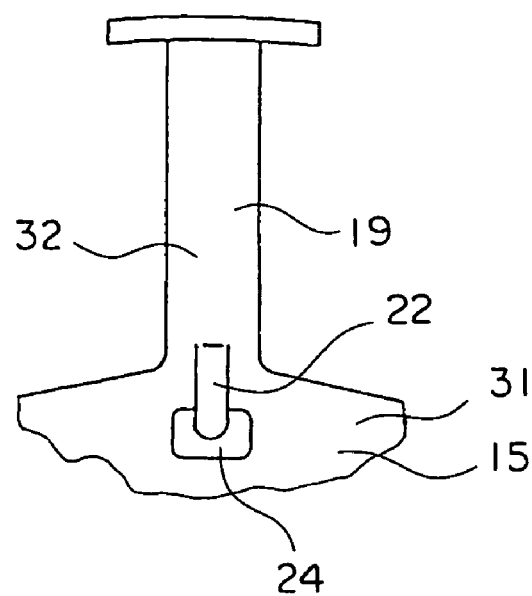
FIG. 6 is a partial enlargement of FIG. 5 before a bent portion is bent.
Figure 7:
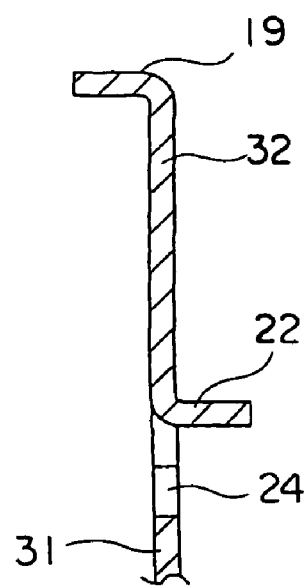
FIG. 7 is a partial lateral cross section of FIG. 5.

As shown in FIG. 6, tip portions of the bent portions 22 are arc-shaped, and the tip portions are bent such that the arc-shaped bent portions 22 have an L-shaped cross section as shown in FIG. 7.

Receiving apertures 23 are formed so as to extend from two end surfaces of the laminated body 18 so as to face each other along a line in the direction of the axis of rotation A-A, and the first end plate 19 and the second end plate 20 are joined to the laminated body 18 by engaging the bent portions 22 in these receiving apertures 23. Moreover, a depth dimension of the receiving apertures 23 is set to a length over which tip end surfaces of the bent portions 22 come into contact with the intermediate plates 17 or longer.

Figure 8:
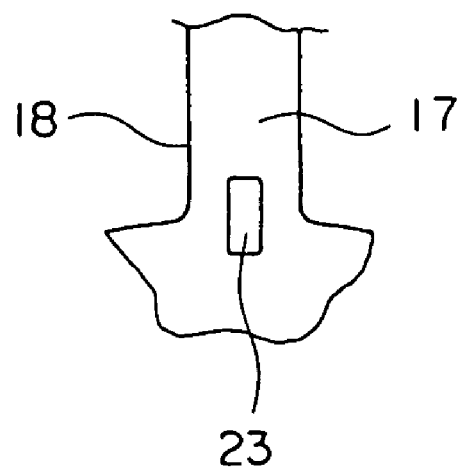
FIG. 8 is a partial front elevation of an intermediate plate from FIG. 4.
Figure 9:
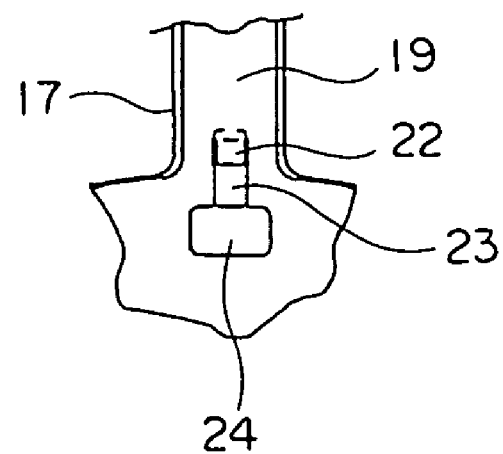
FIG. 9 is a diagram that shows a state when the end plate from FIG. 5 is stacked on the intermediate plate from FIG. 8.

FIG. 9 is a diagram that shows a state when the first end plate 19 is stacked on the intermediate plate 17 that is shown in FIG. 8, first and second circumferential side portions of the bent portions 22 having an interference fit relative to the receiving apertures 23, and the bent portions 22 being engaged in the receiving apertures 23 by press-fitting.

In a magnetoelectric generator that has the above configuration, the flywheel 3 rotates interdependently with a rotating shaft 33 that is driven to rotate by the internal combustion engine, and as it does so electric power is generated in the generating coils 13 due to the alternating magnetic field generated by the permanent magnets 4. The resulting alternating-current output is rectified by rectifying diodes (not shown), and is supplied to a load such as a vehicle battery, etc.

In a magnetoelectric generator according to this embodiment, because receiving apertures 23 that extend in a direction parallel to a line of the axis of rotation A-A are formed in the laminated body 18, and these receiving apertures 23 engage with bent portions 22 that are formed by cutting and bending the first end plate 19 and the second end plate 20 as explained above, joining strength between the first end plate 19 and the second end plate 20 and the respective intermediate plates 17 is improved significantly compared to conventional configurations in which end plates and intermediate plates are joined by dowel crimping.

Consequently, gaps are less likely to occur between the end plates 19 and 20 and the intermediate plates 17, enabling the formation of pinholes in the insulating resin film 14 at such gaps to be reduced significantly.

Since joining strength among the intermediate plates 17 is also improved, the strength of the teeth 16 is also increased.

Consequently, inclining of the teeth 16 in a direction of unbalanced forces due to unbalanced forces acting on the teeth 16 when the generating coils 13 are being manufactured by winding the conducting wires onto the teeth 16 is reduced, also enabling winding collapse to be reduced when winding the conducting wire, thereby improving productivity.

The magnitude of the joining strength of the stator core 12 can also be increased simply by increasing the length of the bent portions 22.

Because the bent portions 22 are disposed radially outside the penetrating apertures 30 of the stator core 12, the present invention can also be applied to magnetoelectric generators that enable the stator core 12 to be made lightweight by removing weight from radially inner portions of the stator core 12.

Now, when the intermediate plates 17 and the end plates 19 and 20 are manufactured by pressing steel plates, respective portions corresponding to the root portions of the teeth 16 of the stator core 12 are easily deformed, and gaps arise easily between the end plates 19 and 20 and the intermediate plates 17 and also between adjacent intermediate plates 17.

In this embodiment, because the bent portions 22 are disposed on the root portions of the teeth 16, where gaps arise particularly easily and insulation failure occurs easily, occurrence of insulation failure as a result of gaps can be prevented efficiently.

Since the bent portions 22 are formed by cutting and bending the end plates 19 and 20 and can be formed simply as a step in the press working of the end plates 19 and 20, the end plates 19 and 20 can be joined to the laminated body 18 without requiring either new parts or materials.

Because the window portions 24 are formed on the end plates 19 and 20 radially inside the bent portions 22, the bent portions 22 can be engaged in the receiving apertures 23 simply by deforming them into an L shape through the window portions 24.

Since the first and second circumferential side portions of the bent portions 22 have an interference fit relative to the receiving apertures 23, if the axis of the laminated body 18 is inclined after being laminated, that axis is forcibly adjusted so as to be aligned properly in the direction of the axis of rotation A-A when the bent portions 22 are engaged in the receiving apertures 23 by press-fitting.

Because the tip portions of the bent portions 22 are arc-shaped and tapered, the tip portions are prevented from tearing inner wall surfaces of the receiving apertures 23 and giving rise to burrs, etc., when the bent portions 22 are being bent and engaged in the receiving apertures 23, thereby preventing burrs from being introduced inside the stator core 12.

Figure 10:
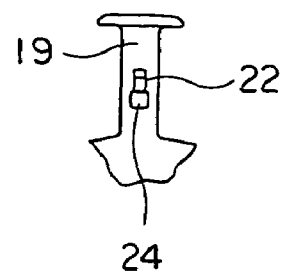
FIG. 10 is a diagram that shows an example in which a bent portion is formed in a different position from the bent portion shown in FIG. 5.

Moreover, in Embodiment 1 above, the bent portions 22 were formed by cutting and bending root portions of the tooth portions 32, but the bent portions 22 may also be formed by cutting and bending intermediate portions of the tooth portions 32 as shown in FIG. 10.

Figure 11:
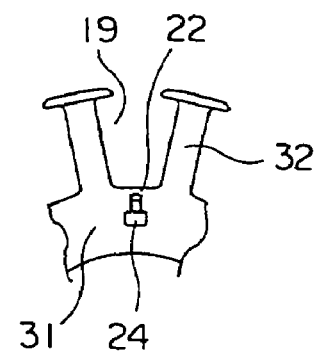
FIG. 11 is a diagram that shows an example in which a bent portion is formed in a different position again from the bent portion shown in FIG. 5.

As shown in FIG. 11, the bent portions 22 may also be formed by cutting and bending root portions between adjacent tooth portions 32.

Figure 12:
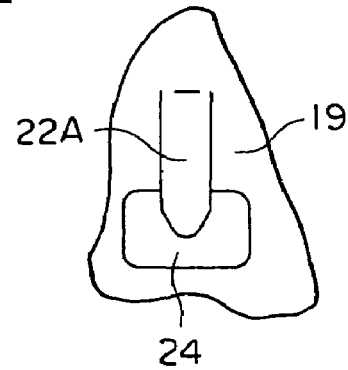
FIG. 12 is a diagram that shows a bent portion that has a different shape from the bent portion that is shown in FIG. 6.
Figure 13:
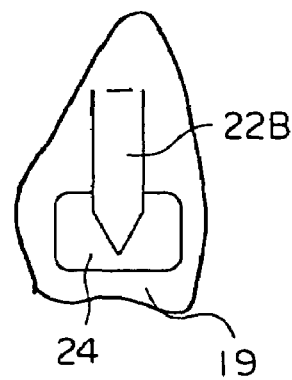
FIG. 13 is a diagram that shows a bent portion that has a different shape again from the bent portion that is shown in FIG. 6.

In Embodiment 1 above, the tip portions of the bent portions 22 were arc-shaped, but bent portions 22A in which tip end surfaces are arc-shaped as shown in FIG. 12 or bent portions 22B in which tip portions are tapered as shown in FIG. 13 may also be used, for example.

What is claimed is:

1. A magnetoelectric generator comprising:
    a bowl-shaped flywheel that rotates around an axis of rotation;
    a plurality of permanent magnets that are fixed to an inner wall surface of said flywheel and that rotate together with said flywheel;
    a stator core that is disposed radially inside said permanent magnets, that comprises an annulus portion and a plurality of teeth that project radially outward from said annulus portion, and that also has an insulating film formed on a surface; and
    a generating coil that is configured by winding conducting wire onto said teeth,
    said stator core comprising:
        a laminated body in which a plurality of intermediate plates that have dowels are laminated so as to be integrated by dowel crimping between layers; and
        a pair of end plates that are disposed so as to be positioned on opposite sides of two end surfaces of said laminated body,
    wherein a receiving aperture that extends parallel to said axis of rotation is formed on said laminated body, an engaging portion is disposed on said end plates, and said end plates are joined to said laminated body by engaging said engaging portion in said receiving aperture.

2. A magnetoelectric generator according to claim 1, wherein said engaging portion is disposed radially outside a penetrating aperture that is formed on said stator core and through which passes a fixing member that is fixed to a nonrotating body.

3. A magnetoelectric generator according to claim 1, wherein said engaging portion is disposed on a root portion of said teeth.

4. A magnetoelectric generator according to claim 1, wherein said engaging portion is a bent portion that has an L-shaped cross section that is formed by cutting and bending said end plate.

5. A magnetoelectric generator according to claim 4, wherein a window portion is formed radially inside said bent portion of said end plate.

6. A magnetoelectric generator according to claim 4, wherein two circumferential side portions of said bent portion have an interference fit relative to said receiving aperture.

7. A magnetoelectric generator according to claim 4, wherein a tip portion of said bent portion has a tapered shape.

* * * * *